United States Patent [19]

Pollock et al.

[11] Patent Number: 4,477,158
[45] Date of Patent: Oct. 16, 1984

[54] LENS SYSTEM FOR VARIABLE REFRACTION

[76] Inventors: Stephen C. Pollock, 7206 Oak St., Apt. 1-SW, River Forest, Ill. 60305; James M. Grisolano, Jr., c/o Office of Medical Education, St. Francis Hospital, 355 Ridge Ave., Evanston, Ill. 60202; Gholman A. Peyman, 535 N. Michigan Ave., Apt. 3001, Chicago, Ill. 60611

[21] Appl. No.: 311,663

[22] Filed: Oct. 15, 1981

[51] Int. Cl.³ .................. G02B 1/06; G02B 3/12; G02C 7/04; G02C 7/06
[52] U.S. Cl. .................. 351/169; 350/419; 351/41; 351/161
[58] Field of Search .................. 351/41, 159, 161, 168, 351/169; 350/418, 419

[56] References Cited
U.S. PATENT DOCUMENTS 3,598,479  8/1971  Wright et al. .................. 350/419 X
4,174,156 11/1979  Glorieux .................. 351/161 X

FOREIGN PATENT DOCUMENTS 90030  2/1961  Denmark .................. 350/419
1279252 11/1961  France .................. 351/161

Primary Examiner—John K. Corbin
Assistant Examiner—Scott J. Sugarman
Attorney, Agent, or Firm—Robert E. Wagner; Ralph R. Rath

[57] ABSTRACT

A lens system for variable refraction comprising a solid housing having a single internal chamber completely filled with a plurality of imiscible liquids of preselected densities and refractive indices. The chamber is of a form such that the amount and distribution of each liquid in the optical portion of the system is altered when the system is tilted, producing a change in refractive power. The system may be incorporated into spectacle lenses or contact lenses to provide a continuous spectrum of refractive power, or into contact lenses to provide bifocal capability.

33 Claims, 19 Drawing Figures

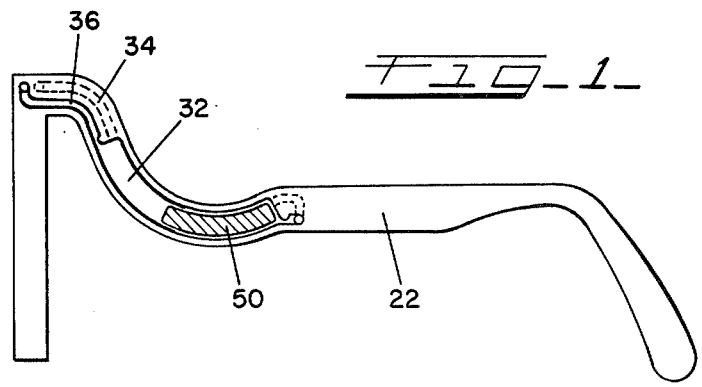
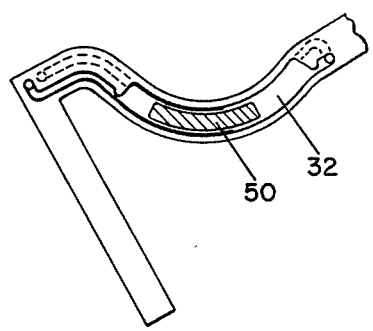
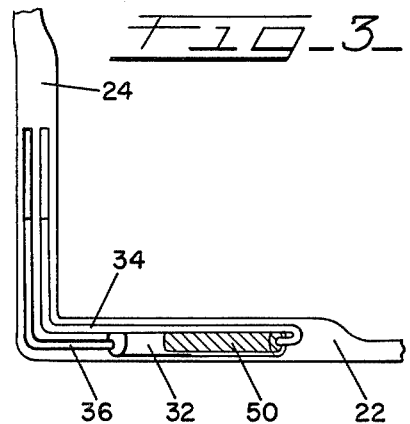
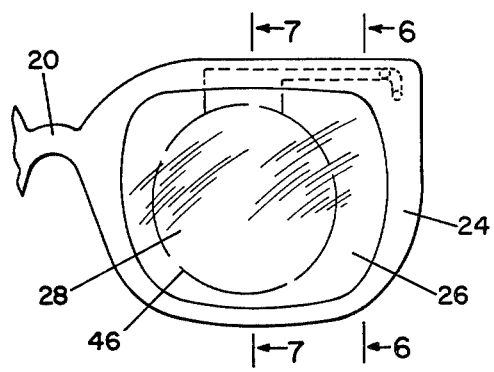
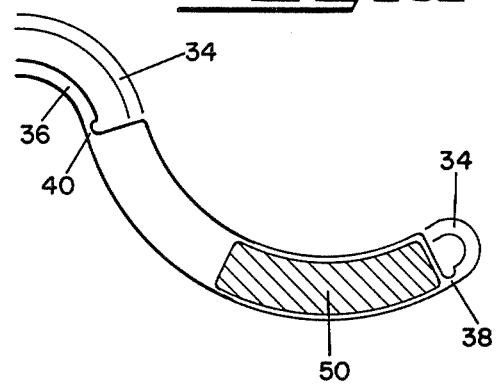

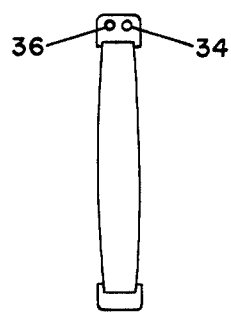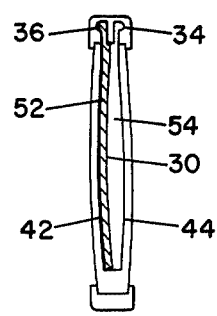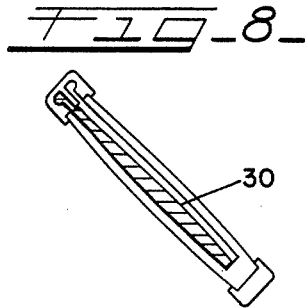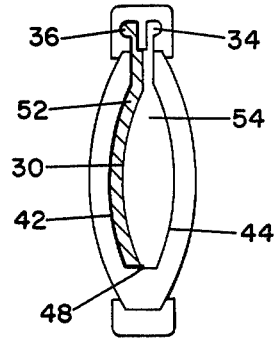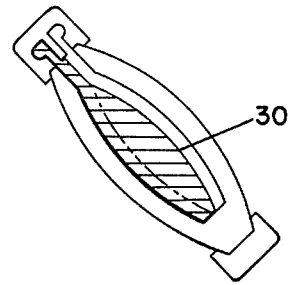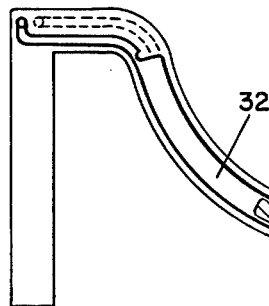

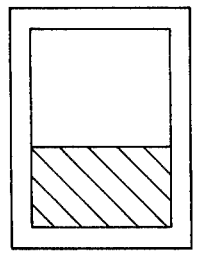
FIG-12-
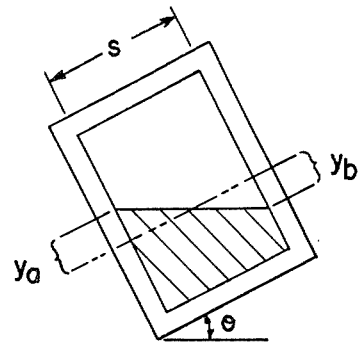
FIG-13-
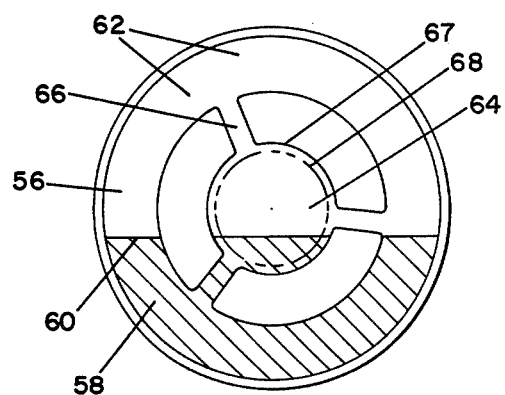
FIG-14-
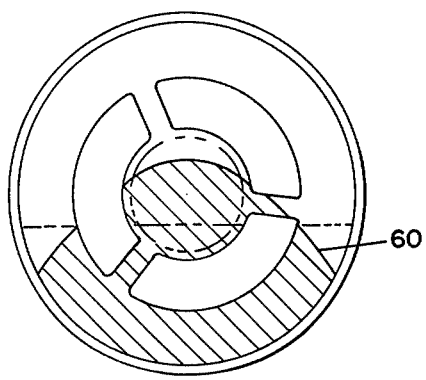
FIG-15-

LENS SYSTEM FOR VARIABLE REFRACTION

DESCRIPTION

1. Technical Field

The present invention relates generally to variable refraction means and, more particularly, to a lens system for correction of impaired accommodation.

2. Background Prior Art

Good visual acuity requires that an individual be able to focus upon objects in the visual field. The ability to focus is conferred by the part of the eye called the lens. Normally, light rays from an external object pass through the lens on their way to the retina at the back of the eye. As light rays pass through the lens, they are bent or refracted so as to project a clear image on the retina. The amount of bending is termed refractive power. The refractive power needed to focus upon an object depends upon how far away the object is; close objects require more refractive power than distant objects.

A healthy lens changes its refractive power by changing its shape. The lens may undergo this alteration in shape, termed accommodation, by virtue of its elastic properties. Should the lens become inelastic, as often occurs with aging, or be removed surgically because of cataract or other disease states, the ability to accommodate becomes suboptimal. Specialized types of spectacles and contact lenses have been used in an attempt to restore accommodative ability. Each suffers from either a severely contracted visual field, a limited number of refractive powers, a limited area on the optical surface available for refracting light rays from any particular distance or a combination of these.

For example, the most common type of aid utilized today for correction of impaired accommodation incorporates a bifocal spectacle lens. This system is extremely cumbersome for the wearer since the eye must be alternately aligned with two discreet areas of the lens in order to achieve two different refractive powers. In addition, the visual field is reduced relative to unifocal spectacles. A variety of bifocal hard contact lenses have also been tried, generally without satisfactory results.

More recently, it has been proposed that liquids be used to produce either a spectacle lens or a contact lens having more than a single refractive power, and examples of such proposals are disclosed in U.S. Pat. Nos. 2,241,415; 2,437,642; 3,598,479; 3,614,215; and, 4,174,156. French Pat. No. 1,279,252 also discloses the use of liquids to produce variable power lens systems. So far as is presently known, none of these systems have achieved any degree of clinical or commercial success. In short, there is a great need for an improved lens system for the correction of impaired accommodation.

SUMMARY OF THE INVENTION

The present invention is a lens system for variable refraction having both solid and liquid components. The system includes a part termed the optical zone that serves to refract light rays and that also has both solid and liquid components. The solid components of the system comprise a housing having an internal closed space or chamber. A portion of the chamber spans the entire optical zone, and the housing is transparent in this region. Two or more immiscible liquids completely occupy the chamber. At least two of the contained liquids are transparent, and only transparent liquids have access to the optical zone. Each of the transparent liquids has a different refractive index. The following two relationships between the transparent liquids and the optical zone relate to the two general categories into which the several preferred embodiments of the present invention fall:

1. Two transparent liquids simultaneously constitute the liquid component of the optical zone such that the interface between them is always disposed essentially perpendicular to the optical axis.
2. Only one transparent liquid at a time constitutes the liquid component of the primary portion of the optical zone.

Differences in density exist between certain of the contained liquids, and such differences are responsible for gravitationally-mediated redistribution of the liquids when the system is tilted relative to the earth. Redistribution of the liquids results in a change in the refractive power of the system. Specifically, if condition 1 obtains, the change in power is due to partial displacement from the optical zone of one transparent liquid by another leading to a change in the curvature of the interface between the liquids. As this change is continuous in character, embodiments of the present invention manifesting this type of refractive power change all provide a continuous spectrum of refractive power. Preferred embodiments providing this function include continuous spectrum spectacles and continuous spectrum contact lenses. If condition 2 obtains, the change in power results from total displacement from the primary portion of the optical zone of one transparent liquid by another. The preferred embodiment of the present invention manifesting this type of refractive power change is a bifocal contact lens incorporating singly or in combination any of three distinct modifications of a closed chamber defining a simple convergent or divergent liquid lens confined to the area over the cornea.

In the detailed description to follow, the continuous spectrum spectacles will be discussed first, followed by bifocal contact lenses. Because of numerous structural similarities between the bifocal contact lenses and the continuous spectrum contact lenses, discussion of the latter will immediately follow discussion of the bifocal contact lenses.

BRIEF DESCRIPTION OF ILLUSTRATIONS

FIG. 1 is a side cross-sectional view of the earpiece and frame of a pair of spectacles;

FIG. 2 is a fragmentary cross-sectional view similar to FIG. 1 showing the spectacles in a tilted position;

FIG. 3 is a fragmentary top projectional view of the earpiece and upper portion of the frame of a pair of spectacles;

FIG. 4 is a fragmentary front view of the spectacles;

FIG. 5 is a larger-than-scale side view of the curved cylinder and associated connecting channels;

FIG. 6 is a side cross-sectional view of the frame and lens of a pair of spectacles, as viewed along line 6—6 in FIG. 4.

FIG. 7 is a side cross-sectional view of the frame and lens of a pair of spectacles, as viewed along line 7—7 in FIG. 4.

FIG. 8 is a cross-sectional view similar to FIG. 7, showing the spectacles tilted 45°.

FIG. 9 is a schematic representation of a side cross-sectional view of the frame and lens of a pair of spectacles, as viewed along line 7—7 in FIG. 4.

FIG. 10 is a schematic representation similar to FIG. 9, showing the spectacles tilted 45° and outlining the range of variable surface movement.

FIG. 11 is a side cross-sectional view of the earpiece and frame of a pair of spectacles in which the curved cylinder has a volume twice that of the cylinder represented in FIG. 1.

FIG. 12 is a schematic illustration of a solid housing enclosing a chamber completely filled by two immiscible liquids having different densities.

FIG. 13 is a schematic illustration similar to FIG. 12, showing the housing in a tilted position and setting forth the variables that relate to relevant parameters of liquid redistribution.

FIG. 14 is a front projectional view of a bifocal contact lens having a chamber with an annular aspect.

FIG. 15 is a front projectional view similar to FIG. 14, showing the contact lens in a tilted position.

DETAILED DESCRIPTION

Figure 16:
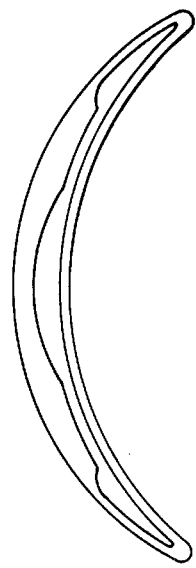
FIG. 16 is a schematic representation of a side cross-sectional view of a contact lens in which the chamber has augmented peripheral depth.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

The first preferred embodiment of the present invention is a pair of spectacle lenses that provide the wearer with a continuous spectrum of refractive power within a specified range, generally equal to three diopters. The spectacles consist of two functionally-identical mirror-image optical systems interconnected by a nosepiece 20. Each system includes a housing that encloses a single complex chamber. The housing is composed of an earpiece 22, a frame 24 and a solid lens 26. The chamber is continuous between all three housing components. That portion of the chamber that occupies the solid lens defines the optical zone 28. The chamber contains three immiscible liquids; two transparent liquids of equal density but differing in refractive index, plus a column of denser liquid confined to the earpiece. Both transparent liquids simultaneously constitute the liquid component of the optical zone and form between themselves an interface termed the variable surface 30. The distribution of the liquids in the optical zone is such that the variable surface is disposed essentially perpendicular to the optical axis at all times. Downward tilt of the system from the position of horizontal gaze results in movement of the column of denser liquid within the earpiece and partial displacement from the optical zone of one transparent liquid by the other. This results in a change in the curvature of the variable surface and a change in the refractive power of the system as a whole. Specifically, downward tilt is associated with a progressive change in refractive power in the positive direction.

The chamber has two principal portions, one in the earpiece and the second in the optical zone. The portion of the chamber in the earpiece takes the form of a curved cylinder 32 generally having a single radius of curvature. According to one non-limiting set of dimensions, the curved cylinder 32 describes an arc of 105° and extends from −30° to 75° relative to a vertical plane with the spectacles in the position of horizontal gaze. Cylinder diameter is in the range of 5 millimeters so as to permit sequestration of the cylinder within an earpiece of standard vertical thickness. The radius of curvature of the cylinder and consequent arc length and cylinder volume vary with the volume of transparent liquid necessary to produce a three diopter change in refractive power when fully displaced. This, in turn, is a function of the difference in refractive index between the two transparent liquids as well as optical zone diameter. The relationship between these parameters are elaborated upon in description to follow.

The curved cylinder 32 is continuous at each end across a small aperture with a tubular connecting channel. The channel 34 arising from the distal end of the cylinder originates at aperture 38, then loops back on itself and runs within the earpiece alongside the cylinder, as illustrated in FIG. 3. When it reaches the cylinder's proximal end, it is joined in its course by the second channel 36, originating at aperture 40. The two channels thereafter run in parallel, first within the earpiece toward the latter's junction with the frame, then medially within the upper portion of the frame. Throughout this final segment of their common course, the two channels share the same altitude (spectacles horizontal) with the proximally-arising channel 36 just forward of its distally-arising counterpart. The terminal one centimeter of each channel is continuous inferiorly with that portion of the chamber bounded by solid lens. This span of continuity is centered over the optical zone 28.

The portion of the chamber in the optical zone has a front surface 42 that is spherical in contour and a back surface 44 that is also spherical. According to the non-limiting form of the spectacles illustrated in FIGS. 7-10, the front surface 42 is concave posteriorly and the back surface 44 is convex posteriorly. The perimeter 46 of the optical zone occurs where the margins of the front and back surfaces meet the margins of a surface having the shape of a narrow circular band 48. The circular band 48 is incomplete over a segment of its upper aspect where the portion of the chamber in the optical zone is continuous with the remainder of the chamber. According to one non-limiting set of dimensions, the diameter of the circular band is 3 centimeters. At each point over the optical zone (front projection), the corresponding distance between front and back chamber surfaces is greater than the range of movement of the variable surface at that point. Thus, chamber surface contour does not influence variable surface contour.

With regard to polar properties, surfaces bounding the chamber are of two types. The first, covering the front chamber surface in the optical zone, the forward half of the circular band, the proximally-arising connecting channel and the proximal half of the curved cylinder, is strongly non-polar, i.e., it exerts a strong positive attraction for non-polar liquids but is essentially non-reactive toward polar liquids. The second, covering the back chamber surface in the optical zone, the rear half of the circular band, the distally-arising connecting channel and the distal half of the curved cylinder, is strongly, polar, i.e., it exerts a strong positive attraction for polar liquids but is essentially non-reactive toward non-polar liquids.

A single unbroken column of a very dense liquid 50, preferably mercury, occupies a fixed fraction of the volume of the curved cylinder 32. The mercury column 50 is freely movable within the cylinder. Efflux of mercury from the cylinder is precluded by the small size of the apertures 38 and 40 and by the great intrinsic surface tension of mercury. According to one non-limiting set of dimensions, the mercury column always occupies 60° of the total 105° of cylinder arc. Accordingly, the central 15° sector of the cylinder is always occupied by the mercury column regardless of spectacle orientation. The remaining cylinder volume comprises two mutually exclusive portions of the cylinder distributed one on either side of the central sector, each of which contains at most a single transparent liquid. Thus, the transparent liquid adjacent to one end of the mercury column can never occupy a position in the cylinder subject to occupation by the transparent liquid adjacent to the opposite end of the mercury column. This arrangement prevents the possibility that transparent liquid on one side of the column and adjacent to the cylinder wall might be overrun by the moving mercury and come to be trapped on the opposite side of the column.

The great density of mercury relative to the transparent liquids assures that it will provide a reliable gravitationally-mediated drive for the system.

Two immiscible transparent liquids of equal density, but having different refractive indicies, occupy the remainder of the chamber. Liquid 52 is highly nonpolar, while liquid 54 is highly polar. The two liquids are separated in the curved cylinder by the mercury column 50, but are in contact with each other in the portion of the chamber in the optical zone. The interface between the two liquids is termed the variable surface 30. The condition of equal density permits the general disposition of the two liquids in the portion of the chamber in the optical zone to be independent of gravitational effect, being rather under the sole influence of forces operating between the liquids and the chamber surfaces. These forces are related to the polar properties of the liquids and the chamber surfaces. More specifically, a strong positive attraction exists between the non-polar liquid 52 and all non-polar chamber surfaces. Similarly, a strong positive attraction exists between the polar liquid 54 and all polar chamber surfaces. As a result, the non-polar liquid 52 always covers the entire front chamber surface in the optical zone and the forward half of the circular band, in addition to filling the proximal connecting channel and the proximal portion of the cylinder unoccupied by mercury. The polar liquid 54 fills the complementary space in the optical zone, covering the entire back chamber surface in the optical zone and the rear half of the circular band, in addition to filling the distal connecting channel and the distal portion of the cylinder unoccupied by mercury. Thus, the variable surface 30 spans the optical zone and is always disposed essentially perpendicular to the optical axis.

The geometric characteristics of the variable surface 30 are determined by thermodynamic laws related to the concept of free energy. In particular, a system will tend toward the state having a minimum of free energy. In the case of two imiscible liquids of equal density, but having different polar properties and in contact with one another, free energy is minimized when the surface area over which contact occurs is minimized. This translates geometrically into a spherical surface. Thus, the variable surface is at all times spherical in contour.

A few additional specifications may be applied to the above overview of structure. According to one non-limiting set of dimensions, optical zone diameter is 3 centimeters and the difference in refractive index between the transparent liquids is 0.4. Under these circumstances, approximately 0.3 milliliters of liquid must be displaced from the optical zone to provide a 3 diopter change in refractive power. In a curved cylinder whose diameter is 5 millimeters, this volume represents an arc length of approximately 1.5 centimeters. Where this length accounts for 45° of cylinder arc, the radius of curvature of the cylinder is approximately 1.87 centimeters. The remaining 60° of cylinder arc is occupied by the mercury column, whose volume is, therefore, approximately 0.4 milliliters.

The volume requirement for refractive power change varies inversely with the difference in refractive index between the two transparent liquids. Consequently, substituting a difference in refractive index of 0.2 for 0.4 without any change in optical zone diameter doubles the above volume requirement. If cylinder diameter remains 5 millimeters, arc length is also doubled, as is the radius of curvature of the cylinder (compare, for example, FIG. 1 and FIG. 11). In addition, the volume requirement varies directly with the fourth power of optical zone diameter. As a result, the increase in volume requirement accompanying a percentage increase in optical zone diameter is greater than the decrease in volume requirement accompanying a similar percentage increase in refractive index difference. Moreover, the range of naturally-occurring refractive index values from which to generate a refractive index difference is limited. Therefore, in general, increases in optical zone diameter beyond 3 centimeters necessitate increases in the volume of liquid that must be displaced to produce a 3 diopter change in refractive power.

There exist many combinations of available materials from which the principal components of the subject spectacles could be formed. By way of example and not of limitation, non-polar surfaces could be composed of glass treated with dimethyldichlorosilane and the non-polar liquid could be cyclo-tetra (methylphenyl) siloxane. The polar liquid could be a 16.27% NaCl aqueous solution by weight and the polar surface could be glass. Note that the freezing points of the two liquids are low enough to prevent solidification at temperatures in the low end of the range characteristic of temperate climates.

The fundamental functional feature of each system is the interdisplacement and consequent redistribution of the liquids in the chamber that occurs with spectacle tilt.

A change in orientation of the spectacles within their function range, generally from the position of horizontal gaze to 45° downward tilt, redefines what constitutes the inferiormost 60° portion of the curved cylinder. Since mercury is much denser than the transparent liquids, it will always tend to occupy a position below these liquids within the limits imposed by chamber structure. Movement of the mercury column to the inferiormost position in the cylinder provides the sole impetus for displacement; because the two transparent liquids have the same density, there is no tendency for them per se to redistribute in response to a change in spectacle orientation.

With downward tilt, the mercury column displaces proximally and the non-polar liquid is forced out of the proximal end of the cylinder, through the proximal connecting channel and into the optical zone. An equal volume of polar liquid exits the optical zone, traverses the distal connecting channel and fills that portion of the distal end of the cylinder vacated by the mercury column. However, because of the fixed relationship between the transparent liquids and their respective chamber surfaces, the variable surface is fixed at its perimeter to the junction in the optical zone of non-polar and polar surfaces, i.e., to that circumference of the circular band dividing it into forward and rear halves. As a result, displacement of one liquid by the other in the optical zone manifests as a change in the contour of the variable surface.

Five surfaces contribute to the refractive power of the system. Since each transparent liquid covers its respective surface in the optical zone independently of spectacle orientation, all four surfaces involving the solid housing have constant power values. It is the change in power of the variable surface that accounts for the change in power of the system as a whole.

With the spectacles in the position of horizontal gaze, there is a minimum of non-polar liquid in the optical zone, and the variable surface is maximally concave posteriorly. If the refractive index of the non-polar liquid is greater than that of the polar liquid, then the variable surface exerts a negative refractive power with respect to light passing from the non-polar into the polar liquid. During the initial phase of downward tilt, the amount of non-polar liquid in the optical zone increases the expense of the polar liquid, and the variable surface becomes less concave, i.e., comes to have an increased radius of curvature. The refractive power of the variable surface is accordingly less negative, and the system as a whole achieves more power in the positive direction.

The portion of the chamber in the optical zone may or may not be symmetrical with respect to a plane perpendicular to the optical axis and intersecting the latter at a point midway between the front and back chamber surfaces in the optical zone. If symmetrical (as illustrated in FIGS. 7-10), then front and back surfaces have the same radius of curvature, the front surface being concave posteriorly and the back wall convex posteriorly. In this case, displacement from the optical zone of polar by non-polar liquid produces sequential changes in variable surface contour that are symmetrical around the plane of symmetry. In particular, the variable surfaces passes through the plane of symmetry at mid-tilt (generally 22.5°) when equal amounts of non-polar and polar liquid are present in the optical zone. Tilt beyond this point results in the variable surface being convex posteriorly. At full tilt (generally 45°), the mercury column has displaced all non-polar liquid from the curved cylinder. There is a maximum amount of non-polar liquid and a minimum of polar liquid in the optical zone. The variable surface is maximally convex, having a radius of curvature equal to that present in the position of horizontal gaze. The refractive power of the variable surface is maximally positive as is the power of the system as a whole. Return of the spectacles toward the position of horizontal gaze produces an exact reversal of changes occurring on downward tilt; a given orientation of the system is always associated with a given refractive power regardless of whether that orientation was achieved by upward or downward tilt.

The portion of the chamber in the optical zone may be asymmetrical with respect to the aforementioned plane on the basis of having a back surface that is (1) convex posteriorly but with a radius of curvature larger than that of the front surface, (2) planar, or (3) concave posteriorly with a radius of curvature larger than that of the front surface. Since the volume of transparent liquid necessary to produce a 3 diopter change in refractive power when fully displaced generally corresponds to a range of movement of the variable surface sufficient to bring the latter into close proximity with the chamber surfaces, these variations do not permit the extremes of variable surface contour to be symmetrical. In particular, the variable surface cannot achieve as much refractive power in the positive direction as can be achieved with a symmetrical chamber in the optical zone. In order to preserve a 3 diopter range, asymmetrical designs must additionally incorporate a front chamber surface having a smaller radius of curvature than is required in symmetrical designs.

Though the contour of the variable surface determines the refractive power of the system within the functional range, it is the curvatures of the four surfaces associated with the solid housing that determine where along the continuum of refractive power the 3 diopter range occurs.

Resistance of the system to liquid displacement, chiefly a function of aperature and connecting channel caliber and transparent liquid viscosity, is sufficient to damp out prolonged flux around the position of eventual equilibration. Specifically, the mercury column stablizes within about one second, which is within the range of physiologic accommodation. Note that if the connecting channel caliber that yields the desired period of accommodation also prevents efflux of mercury from the curved cylinder, the need for apertures is eliminated.

The volume of liquid displaced when system orientation is changed is a function of the arc length traversed by the mercury column during the change. This, in turn, is a function of the radius of curvature of the curved cylinder over that segment of cylinder arc that passes through the inferiormost position during the change in orientation and thus is traversed by the center of gravity of the mercury column. In general, the radius of curvature of the cylinder is uniform along its entire length. However, a cylinder characterized by a variable radius of curvature can be employed to augment or decrease the change in refractive power corresponding to a given change in orientation within the functional range of tilt. Specifically, an increase in the radius of curvature of a given segment of cylinder arc results in an increased arc length and cylinder volume over that segment and is therefore associated with an increase in the change in refractive power that occurs when the spectacles are tilted through the range that corresponds to the augmented segment of cylinder passing through the inferiormost position. Conversely, a decrease in the radius of curvature of a given segment of cylinder arc will decrease the change in refractive power that occurs as that segment passes through the inferiormost position.

Minor adjustments of head position typically occur during activities requiring far vision, producing small deviations in spectacle orientation from the position of horizontal gaze. In order to prevent refractive power from changing in response to these deviations, certain adaptations may be incorporated into curved cylinder design. One alternative is to rotate the 105° cylinder within the earpiece in the positive direction. For instance, ten degrees of rotation (cylinder extends from −20° to 85° with spectacles in the position of horizontal gaze) affords a 10° stable zone over which downward tilt produces no liquid displacement and no change in refractive power. This is due to the fact that the 60° mercury column, confined as it is to the cylinder, has a center of gravity located +10° from the inferiormost point in the cylinder with the spectacles horizontal. As a result, over the first 10° of downward tilt, the column will have a tendency to remain in contact with the distal end of the cylinder. Only when tilt exceeds 10° does the inferiormost point in the cylinder exceed 10°, leading to proximal displacement of the mercury column. With this adaptation, the functional range of tilt is shifted 10°, from 0°–45° to 10°–55°.

An alternative adaptation also affords a stable zone but retains the degree of tilt necessary for maximal change in refractive power, generally 45°. If a stable zone of 10° is chosen, then it is clear that total displacement of liquid must occur between 10° and 45° of tilt, i.e., over 35° of downward tilt. With a uniform radius of curvature of the cylinder, this means that transparent liquid occupies 35° of cylinder arc. In order to maintain a 15° central sector of mercury-filled cylinder in all positions of gaze, the mercury column must occupy 50° of cylinder arc. Thus, total cylinder arc is 85°. Moreover, the center of gravity of the mercury column (25° from either end) must be located +10° from the inferiormost point in the cylinder with spectacles horizontal if a 10° stable zone is to be achieved. Therefore, the cylinder must extend from −15° to +70° with spectacles horizontal. Note that cylinder diameter must be adjusted slightly upward if the volume of liquid displaced from 35° of cylinder arc is to be equal to that displaced from 45° of arc.

In order that patients be able to secure refractive power at a single value during certain activities, a fixed power mode may be incorporated into spectacle design that enables the wearer to lock the liquids into a particular relationship with the chamber and with each other until such a time as return to automatic change in refractive power is desired. The mechanism involves blockage of flow through a single connecting channel either by compression of the channel or by introduction into the channel of an obstructing process. Fixed power mode is controlled by pressing a button (not shown) on the frame or earpiece that alternately engages and disengages the mechanism.

Note that in external appearance, the spectacles of the present invention are virtually indistinguishable from ordinary unifocal spectacles.

The spectacles described above improve upon prior art lenses for correction of impaired accommodation in a large number of ways. The subject spectacles change refractive power over a continuous spectrum and thus allow patients with any degree of presbyopia to easily focus upon objects at any distance within a generally useful range. This ability represents a distinct advantage over any form of bifocal in patients with minimal or absent accommodative ability. In addition, the spectacles automatically change refractive power over a continuous spectrum in response to changes in spectacle orientation. This eliminates the need for the wearer to make a manual adjustment for every desired change in refractive power, as is the case with certain prior art spectacles providing a continuous spectrum of refractive power.

By engaging the no-flow mechanism on the spectacles, refractive power can be fixed and thereby made independent of spectacle orientation. In the subject spectacles then, each refractive power within the continuous spectrum is available for vision in all orientations. Thus, the subject spectacles provide a fixed power mode analogous to that characterizing manually-operated spectacles providing a continuous spectrum of refractive power, plus the much more useful and convenient automatic mode.

In any given orientation of the spectacles, the refractive power over the entire optical zone is uniform. As a result, the field of vision is always full, being provided by the entire optical zone. Using traditional bifocals, the visual field available with distance correction is limited inferiorly while the visual field available with near correction is markedly constricted. Aspheric multifocal spectacles, while providing a continuous spectrum of available refractive powers, do so at a cost of extreme constriction of the visual field for any given refractive power. Thus, in terms of field of vision, the spectacles of the present invention are better than spectacles having far fewer available refractive powers, i.e., bifocals, and much better than aspheric multifocal lenses.

Because the subject spectacles are able to change their intrinsic power, a single optical axis centered in the spectacle frame provides the wearer with all powers within the specified range. This permits the eye at all times to maintain its most natural position in the orbit, its axis colinear with that of the spectacle lens. In bifocal and aspheric multifocal spectacles, there are as many optical axes as powers, a situation that requires the wearer to undergo awkward and uncomfortable dissociations of head and eye movements in order to bring the axis of the eye into line with the optical axis of the appropriate portion of the lens.

Since the chamber in the subject spectacles is filled entirely with liquid substances, the spectacles are not subject to condensation and consequent fogging of internal surfaces with temperature change as are prior art spectacles having a closed chamber filled in part by gas. In addition, the spectacles have better light transmissibility and less internal reflection than the aforementioned prior art spectacles since these parameters relate directly to the difference in refractive indices between adjacent media.

The second preferred embodiment of the present invention is a bifocal contact lens incorporating singly or in combination any of three distinct modifications of a closed chamber defining a simple convergent or divergent liquid lens confined to the area over the cornea. The bifocal lens consists of a transparent housing enclosing a single chamber in which are contained two immiscible transparent liquids that differ in density and refractive index. A single liquid constitutes the liquid component of the primary portion of the optical zone at any one time, and a change in refractive power is brought about by total displacement from the primary portion of the optical zone of one liquid by the other. Thus, the optical axis of the lens never traverses more than a single liquid. More specifically, the optical axis passes through the less dense liquid when the lens is in the position of horizontal gaze, and passes through the denser liquid when the lens has been tilted to the position of downward gaze. Distance vision correction in the position of horizontal gaze and near vision correction in the position of downward gaze can be achieved by employing a liquid pair in which the denser liquid has the higher refractive index and by having the surfaces bounding the chamber in the region of the optical zone define a positive liquid lens.

The dynamics of liquid redistribution occurring with tilt form the basis for the bifocal contact lens of the present invention. The denser of the two liquids maintains a position below the less dense liquid independently of housing orientation. As a result, the interface between the two liquids always defines a horizontal plane. With the exception of rotation around an axis perpendicular to the Earth's surface, any change in orientation of the contact lens results in an altered relationship between the housing and the contained liquids. Viewed from the Earth's reference frame, the housing rotates around the liquids which maintain a fixed, gravitationally-determined vertically-stratified relationship to one another and to the Earth. From the reference frame of the housing, the liquids may be considered to move relative to the chamber surfaces in a direction opposite to the direction of downward tilt, thereby moving in conjunction with the Earth, which, relative to the housing, moves in the same direction. Thus, downward tilt redefines which portion of the chamber contains the denser liquid and which portion contains the less dense liquid, and is responsible for the displacement from the optical zone of one liquid by the other.

A change in lens orientation is reflected in an altered relationship between the chamber surfaces and the the interface between the two liquids. Downward tilt results in downward displacement of the more anteriorly-located chamber surfaces and upward displacement of the more posteriorly-located chamber surfaces. Following tilt, anterior surfaces that were immediately supradjacent to the interface will have relocated below the interface while posterior surfaces that were immediately subjacent to the interface will have come to lie above it. Thus, portions of the chamber that originally contained the less dense liquid, but that are bounded by surfaces that displace downward past the interface, come to contain the denser liquid. Similarly, portions of the chamber that originally contained the denser liquid, but that are bounded by surfaces that displace upward past the interface, come to contain the less dense liquid.

FIGS. 12 and 13 illustrate how the relationship between a chamber and two contained liquids is altered when the chamber is tilted.

The following equation expresses the relationship between the variables that describe this alteration:

$$y_a = s \tan \theta - y_b$$

where
 $\theta$ = angle of downward tilt
 $y_a$ = rise in the interface relative to the front wall of the housing
 $y_b$ = drop in the interface relative to the back wall of the housing
 s = chamber span in the plane of rotation In terms of volume, the rise in the dense liquid above its original level anteriorly is always equal to the drop below its original level posteriorly. In terms of distance travelled by the interface along the chamber surfaces, however, the relationship between the rise ($y_a$) and the drop ($y_b$) is a function of the distribution of volume in the chamber. The interface behaves as though it pivots around an axis that permits it to sweep out equal volumes of chamber space anterior and posterior to the axis for any degree of tilt. When the volume of the anterior half of the chamber equals that of the posterior half in the region where displacement of one liquid by the other occurs, the axis lies midway between the anterior and posterior limits of the chamber, and $y_a$ equals $y_b$. If chamber volume is concentrated more anteriorly, the axis is shifted toward the anterior end of the chamber, $y_a$ is decreased and $y_b$ is increased. If chamber volume is concentrated more posteriorly, the axis is shifted toward the posterior end of the chamber, $y_a$ is increased and $y_b$ is decreased.

The optical zone of a contact lens may cover as little as three-fourths of the pupillary area without materially interfering with vision. With regard to lenses with a liquid component in their optical zone, either one or the other of the contained liquids must cover at least three-fourths of the pupillary area. Specifically, the less dense liquid covers at least the upper three-fourths of the pupillary area and the denser liquid no more than the lower one-fourth in the position of horizontal gaze, and the highest permissible level of the interface relative to the pupil is somewhat greater than one-fourth of the pupil diameter above the inferior pupillary margin. On downward tilt, the dense liquid must rise to cover at least the lower three-fourths of the pupillary area, and the lowest permissible level of the highest point on the elliptical interface is approximately one-fourth of the pupil diameter below the superior pupillary margin. Thus, the minimum distance travelled by the interface anteriorly ($y_a$) is approximately one-half the pupil diameter. In order to utilize this distance as a minimum, however, the optical zone portion of the chamber (defined by the limits of those chamber surfaces subserving an optical function) must have a diameter at least as great as that of the pupil since the entire pupillary area is utilized for vision between the two alternate lens orientations. As will be demonstrated in a subsequent discussion of optical parameters, the chamber surface curvatures required to produce the desired change in refractive power permit the optical zone portion of the chamber to achieve a diameter greater than that of the pupil. Thus, the minimum value for $y_a$ is approximately one-half the pupil diameter. Note, too, that the portion of the optical zone that is alternatively occupied by one or the other of the contained liquids, termed the primary portion of the optical zone, has a minimum area equal to one-half the pupillary area.

It is desirable from a clinical standpoint to maximize the rise in the interface anteriorily ($y_a$) when the lens is tilted from the position of horizontal gaze to a position of downward tilt appropriate for near vision, roughly 40°-45°. Referring to the equation that relates this rise to chamber span (s), angle of tilt ($\theta$) and drop in the interface posteriorly ($y_b$), it is clear that for a given value of $\theta$, $y_a$ increases when s increases, $y_b$ decreases, or both occurs. Note that s corresponds to the distance from the anterior limit of the chamber to the posterior limit of the chamber as measured on a lateral projection; the fact that the most anterior portion of the chamber is located centrally while the most posterior portion is located peripherally does not affect the validity of the equation. Each modification herein described of the simple closed chamber relates specifically to maximization of $y_a$.

According to one modification of the simple closed chamber, anterior portions of the chamber that do not constitute a part of the optical zone have been eliminated from the system. Such portions represent superfluous anterior volume and are, therefore, responsible for inflated $y_b$ values. Elimination of these portions is accomplished by confining the bulk of the liquids outside the optical zone to a portion of the chamber having an annular shape and situated peripherally. The annular portion 62 forms a single chamber with the optical zone portion 64 via three radially-arranged connecting channels 66 distributed 120° from one another. The perimeter 67 of the optical zone lies outside the pupillary margin 68. The relative amounts of the two contained liquids are such that the interface 60 between them is at a level crossing the lower end of the optical zone when the optical axis is horizontal (FIG. 14). Since the only chamber surfaces immediately supradjacent to the interface anteriorly are those that bound the liquid portion of the optical zone, downward tilt results in anterior displacement of the less dense liquid 56 by the denser liquid 58 only in the region of the optical zone. The pattern of distribution of the connecting channels assures that rotation of the lens around the optical axis will never lead to a situation where there is not at least one channel positioned so as to permit movement of the denser liquid into the optical zone.

The width of the annular portion of the chamber is critical to optimal lens function. If the width is too small, posterior volume is decreased, whereas if the width is too great, parts of the annular portion of the chamber constitute superfluous anterior volume. The optimal width is that which permits the elliptical interface occuring on downward tilt (front projection) to intersect the inner margin of the annular portion of the chamber where that margin is intersected by the interface in the position of horizontal gaze (FIG. 15).

According to a second modification of the simple closed chamber, peripheral chamber depth is augmented, this augmentation being confined to the portion of the chamber where a drop in the interface between the liquids occurs, i.e., the posterior portion. Augmentation serves to concentrate volume posteriorly and thereby both decrease $y_b$ and increase $y_a$.

Note that augmentation of peripheral chamber depth constitutes a redistribution of chamber volume. As such, it alters the location of the axis around which the interface rotates during tilt of the contact lens. More specifically, augmentation of peripheral chamber depth shifts the axis in a posterior direction, and the degree of shift is a direct function of the degree of augmentation. Since it is this axis that demarcates the junction between anterior and posterior portions of the chamber and thereby defines that portion of the chamber to be augmented, it is clear that the degree of augmentation and the width of the peripheral band of augmentation are interrelated variables; the greater the degree of augmentation, the more peripherally-located is the augmented portion of the chamber and, conversely, increasingly peripheral sequestration of the augmented portion of the chamber necessitates increasing degrees of augmentation. Clinical considerations related to lens thickness impose limits on the degree to which peripheral depth can be augmented, however, and thereby define the structural dimensions of a bifocal contact lens with augmented peripheral chamber depth wherein chamber volume is maximally concentrated posteriorly, $y_b$ is maximally decreased and $y_a$ is maximally increased.

Also note that where augmentation of peripheral chamber depth is employed in conjunction with an annular chamber structure, augmented portions and annular portions of the chamber are identical.

According to a third modification of the simple closed chamber, lens size is increased to produce a scleral bifocal contact lens in which the chamber extends over the sclera. Since chamber shape approximates a circular section of a spherical shell, peripheral extension of the chamber results in an increase in the distance (s) from the anterior limit of the chamber to the posterior limit of the chamber, and thereby increases $y_a$.

Figure 17:
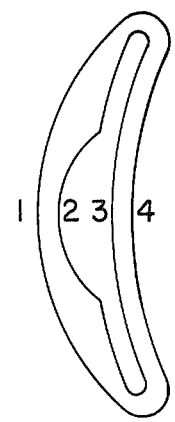
FIG. 17 is a schematic representation of a side cross-sectional view of a contact lens having an internal closed chamber, showing the four optical surfaces in the optical zone.

In the bifocal contact lens system schematically illustrated in FIG. 17, surfaces 1 through 4 sequentially refract light transmitted through the lens system.

According to the thin lens approximation, the refractive power of a lens is equal to the sum of the powers of its individual surfaces. Four surfaces, therefore, contribute to the refractive power of subject bifocal contact lenses, and a change in power of any one of them is reflected in a nearly identical change in power of the lens as a whole. Two surfaces, 1 and 4, have power values which are independent of liquid movement, and which are therefore constant. It is the change in refractive power of surfaces 2 and 3, brought about by total displacement from the primary portion of the optical zone of one liquid by the other, that accounts for the change in refractive power of the lens as a whole.

The general equation for the refractive power (F) of the front surface of a simple lens is:

$$F_f = \frac{n' - n}{r_f}$$

where
 $n'$ = refractive index of lens material
 $n$ = refractive index of surrounding medium
 $r_f$ = radius of curvature of front surface
The corresponding equation for the back surface is:

$$F_b = \frac{n - n'}{r_b}$$

The total power of the lens (T) is simply the sum of the surface powers:

$$T = F_f + F_b = \frac{n' - n}{r_f} + \frac{n - n'}{r_b}$$

In subject bifocal contacts, optical surfaces 2 and 3 define a liquid lens whose total power depends upon whether the denser liquid or the less dense liquid constitutes the liquid component of the primary portion of the optical zone. Thus, equations for total power are distinct for each of the two liquids:

$$T_s = \frac{n_s - n}{r_2} + \frac{n - n_s}{r_3}$$

$$T_w = \frac{n_w - n}{r_2} + \frac{n - n_w}{r_3}$$

where
 $T_s$ = total power of liquid lens with denser liquid
 $T_w$ = total power of liquid lens with less dense liquid
 $n_s$ = refractive index of denser liquid
 $n_w$ = refractive index of less dense liquid
 $n$ = refractive index of housing material
 $r_2$ = radius of curvature of front surface of liquid lens $r_3$ = radius of curvature of back surface of liquid lens Since it is the change in total power of the liquid lens, brought about by displacement of one liquid by the other, that is responsible for the change in power of the contact lens as a whole, the critical equation is that which expresses the difference between $T_s T_w$:

$$T_s - T_w = (n_s - n_w)\left(\frac{1}{r_2} - \frac{1}{r_3}\right)$$

The actual numerical values chosen for $r_2$ and $r_3$ are a function of desired change in dioptric strength, difference in refractive index between the two liquids, and certain geometrical considerations related to clinically optimal optical zone dimensions.

By way of specific example and not of limitation, if the desired change in refractive power is 2.25 diopters, and the liquids employed differ in refractive index by 0.2, then a 0.75 mm difference in radius is required among radii that approximate normal corneal cap curvature (8 mm). Thus, if $r_2$ is 7.8 mm and $r_3$ is 8.55 mm, a person who is accommodated for distance vision when looking through the liquid with the lower refractive index would be accommodated for viewing objects roughly half a meter away when looking through the liquid with the higher refractive index.

Note that surfaces 2 and 3 converge to intersect with one another at a hypothetical distance (X) from the optical axis determined by $r_2$, $r_3$ and the central thickness (t) of the liquid lens. It is imperative that the chamber not taper to zero depth before it has achieved a diameter equal to that of the minimum clinically acceptable optical zone. Since lens function requires that portions of the chamber be located outside the optical zone, the projected points of intersection must in fact lie beyond the zone perimeter in order to have optically active and optically inactive portions form a single chamber. Stated differently, 2X must be greater than the optical zone diameter if the chamber is to have depth at the zone perimeter. Though the minimum acceptable optical zone diameter will vary considerably with pupil size, a value of 4 mm is within the range of clinically-satisfactory values, and will suffice for a semi-quantitative description of the interplay between parameters. If $r_2$ is 7.8 mm, $r_3$ is 8.55 mm, and t is 0.05 mm, then 2X = 5.68 mm, the projected points of intersection lie outside the optical zone perimeter, and a positive value for the depth of the chamber at the junction of optically active and optically inactive portions (perimeter depth) is assured.

Note that, all other variables constant, perimeter depth decreases as optical zone diameter increases. If, for reasons related to ease of liquid movement, an increase in perimeter depth is desired, or if a larger optical zone is desired, two types of dimensional alterations are possible. One alternative is to increase central chamber depth (t). So long as optical zone diameter is sufficiently small relative to $r_2$ and $r_3$, perimeter depth varies with t by roughly similar absolute increments. Since the walls of the transparent housing must have at least a certain minimum thickness, however, increase in t must at some point result in a thicker contact lens, and maximum values for t become a function of clinical tolerances. A second alternative is to decrease the difference between the radii of surfaces 2 and 3. This diminishes the tendency of the two surfaces to converge, and assuming t remains constant, augments chamber depth over the entire optical zone except at the optical axis. If the magnitude of the original change in refractive power is to be maintained, however, the decreased difference between radii must be compensated for by an increase in the difference between the refractive indicies of the liquids employed.

If an increased magnitude of change in refractive power is sought, either the difference in the refractive index between the liquids, the difference between $r_2$ and $r_3$ or a combination of both must be increased.

The advantages of the bifocal contact lens described above are numerous. To begin with, a single area centered in the contact lens provides the wearer with bifocal capability. Movement of the contact lens relative to the eye is therefore unnecessary for changing refractive power, and the contact lens may be of the type that remains relatively stationary on the eye, i.e., a soft contact lens. Such lenses are better tolerated than hard contact lenses. In addition, the mechanism of prism ballast bifocal contact lenses, in which lid-mediated lens movement relocates an optical surface of appropriate power to a position in front of the pupil, is eliminated, as are the associated awkward and uncomfortable dissociations of head and eye movements required to bring the lower lid into contact with a prism ballast bifocal.

The performance of the subject bifocal contacts is unaffected by rotation around their optical axis. Therefore, structural modifications designed to prevent lens rotation, in particular prism ballast, are unnecessary. The subject bifocal contacts are thus simpler in design than prism ballast bifocals. In addition, the elimination of prism ballast will improve patient tolerance since this feature is associated with a large value for edge thickness.

Since the subject bifocal contacts do not change power by means of lid-mediated movement of the contact lens over the cornea, their success is not dependent upon precise assessment of individual lid anatomy and function, and are, therefore, easier to fit than prism ballast bifocals.

A greater average area of lens surface is utilized for collecting and focusing light rays onto the retina in subject bifocal contacts than is utilized in concentric bifocal contact lenses. In the latter, the portion of the lens covering the pupillary area is composed of two different front surfaces, one centrally located, the second disposed concentrically around the first. It is obvious that the fraction of pupillary area covered by each of the two surfaces averages one-half. In the subject bifocal contacts, at lease three-quarters of the pupillary area is covered by surfaces providing appropriate power for the type of vision desired, which results in greater image clarity.

Since the chamber in subject bifocal contacts is filled entirely with liquid substances, the lenses are not subject to condensation and consequent fogging of internal surfaces with temperature change as are prior art contact lenses having a closed chamber filled in part by gas. In addition, subject contact lenses have better light transmissibility and less internal reflection and are less deformable than the aforementioned prior art contact lenses.

The subject bifocal contacts permit a more efficient displacement from the optical zone of one liquid by the other than can be achieved with prior art contact lenses having a chamber that defines a simple covergent or divergent liquid lens confined to the area over the cornea.

The third preferred embodiment of the present invention is a contact lens that provides the wearer with a continuous spectrum of refractive power. The lens consists of a transparent housing enclosing a single chamber in which are contained two immiscible transparent liquids differing in refractive index. The two liquids have slightly different densities. Both liquids simultaneously constitute the liquid component of the optical zone and form between themselves an interface termed the variable surface. The distribution of the liquids in the optical zone is such that the variable surface is disposed essentially perpendicular to the optical axis at all times. Downward tilt of the system from the position of horizontal gaze results in partial displacement from the optical zone of one liquid by the other, leading to a change in the curvature of the variable surface and a change in the refractive power of the system as a whole. Specifically, downward tilt is associated with a progressive change in refractive power in the positive direction.

The configuration of the chamber is similar to that described for a bifocal contact lens in which anterior portions of the chamber that do not constitute a part of the optical zone are eliminated, i.e., the chamber is composed of a central optical zone portion and a peripheral annular portion interconnected by three radially-arranged channels distributed 120° from one another. This configuration increases the efficiency of liquid interdisplacement in the optical zone and also eliminates the disruptive effects of liquid in the remainder of the chamber on the desired change in variable surface contour. Augmentation of peripheral chamber depth and extension of the chamber onto the sclera may also be employed to maximize efficiency of liquid interdisplacement in the optical zone.

The portions of the front chamber surface 70 in the optical zone and in the connecting channels exert a strong surface attraction for the denser of the two liquids 74. The portions of the back chamber surface 72 in the optical zone and in the connecting channels exert a strong surface attraction for the less dense liquid 76. The remaining chamber surfaces, i.e., those bounding the annular portion of the chamber, have no significant attraction for either liquid so that the dynamics of liquid movement in the annular portion of the chamber are similar to those described for bifocal contact lenses.

Figure 18:
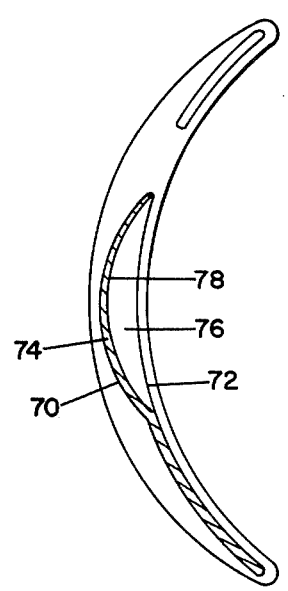
FIG. 18 is a schematic representation of a side cross-sectional view of a contact lens that provides a continuous spectrum of refractive power.
Figure 19:
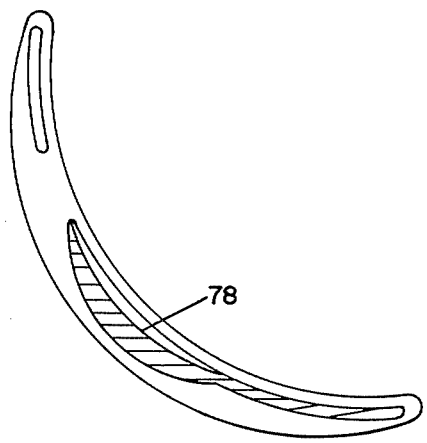
FIG. 19 is a schematic representation similar to FIG. 18, showing the contact lens tilted 45°.

With the lens in the position of horizontal gaze, the denser liquid fills the chamber to a level that crosses the extreme lower end of the optical zone, as illustrated in FIG. 18. In addition, the denser liquid forms a thin minimal layer over the entire front chamber surface in the optical zone as a result of surface attraction. The less dense liquid forms a complementary layer between the layer of denser liquid and the entire back chamber surface in the optical zone. The two layers have a common surface 78, termed the variable surface, that spans the optical zone. The difference in density between the two liquids is too small for gravity to significantly alter the essentially spherical contour of the variable surface.

Five surfaces contribute to the refractive power of the lens. Since each liquid covers its respective chamber surface in the optical zone regardless of lens orientation, all four surfaces involving the solid housing have constant power values. It is the change in power of the variable surface that accounts for the change in power of the lens as a whole.

In the position of horizontal gaze, the thickness of the layer of denser liquid is at a minimum, and the curvature of the variable surface approximates that of the front chamber surface. If the refractive index of the denser liquid is greater than that of the less dense liquid, then the variable surface exerts a negative refractive power with respect to light passing from the denser liquid into the less dense liquid.

With downward tilt, denser liquid tends to flow into the optical zone. As a consequence of surface attraction, displacement from the optical zone of less dense liquid by denser liquid manifests as a thickening of the layer of dense liquid at the expense of the layer of less dense liquid. The radius of curvature of the variable surface is increased, and the power of the variable surface is accordingly less negative. Thus, the contact lens as a whole achieves a more positive power.

On the surface, it may seem contradictory that the amount of each liquid occupying the optical zone for any degree of tilt, i.e., the quantitative aspect of liquid distribution, is based on the existence of a differential gravitational effect on the liquids while the disposition of the liquids in the optical zone, i.e., the qualitative aspect of liquid distribution, is based on the absence of any significant differential gravitational effect. This apparent contradiction can be reconciled by recognizing that a very small difference in density between the liquids satisfies both conditions; any difference in density will assure a graviationally-determined distribution of the liquids in the chamber, and a very small difference is chosen to keep variable surface contour free of significant gravitationally-induced asphericity and consequent optical aberration.

The volume of liquid displaced over the initial 45° of tilt is sufficient to produce a change in the radius of curvature of the variable surface corresponding to a 3 diopter change in refractive power. Return of the lens toward the position of horizontal gaze produces an exact reversal of changes occurring on downward tilt; a given orientation of the lens is always associated with a given refractive power regardless of whether that orientation was achieved by upward or downward tilt.

The continuous contact lens described above has many advantages over prior art lenses for correction of presbyopia. The subject contact lens changes refractive power over a continuous spectrum and thus allows patients with any degree of presbyopia to easily focus upon objects at any distance within a generally useful range. This ability represents a distinct advantage over any form of bifocal in patients with minimal or absent accommodative ability.

As with the bifocal contacts of the present invention, movement of the subject continuous contact lens relative to the eye is unnecessary for changing refractive power. As a result, the subject lens may be of the type that remains relatively stationary on the eye, i.e., a soft contact lens. In addition, the awkward and uncomfortable dissociations of head and eye movements required with prism ballast bifocal contact lenses are eliminated.

Also similar to the bifocal contacts of the present invention is the fact that the performance of the subject continuous contact lens is unaffected by rotation around the optical axis. Prism ballast is therefore unnecessary, making the subject continuous contact lens simpler and better tolerated than prism ballast bifocals. The subject continuous contact lens is also easier to fit than prism ballast bifocals.

In any given orientation of the subject continuous contact lens, the refractive power over the entire optical zone is uniform. As a result, the entire optical zone is utilized to collect and focus onto the retina light rays from any given object distance. Concentric bifocal contact lenses have an optical zone composed of two different front surfaces, each of which covers, on the average, only one-half the pupillary area. Thus, image quality is relatively poor while the number of powers provided is limited to two. Aspheric multi-focal contact lenses, while providing a virtually continuous spectrum of refractive power, do so at a cost severely restricting for any given object distance the area of the optical zone involved in collecting and focusing light rays onto the retina. By comparison with the subject continuous contact lens, they suffer from severe impairment of image quality.

Since the chamber in the subject continuous contact lens is filled entirely with liquid substances, the lens is not subject to condensation and consequent fogging of internal surfaces with temperature change as are prior art contact lenses having a closed chamber filled in part by gas. In addition, the subject continuous contact lens has better light transmissibility and less internal reflection and is less deformable than the aforementioned prior art contact lenses.

We claim:

1. A lens system for variable refraction having an optical zone for refracting light rays, said system comprising a solid housing that is transparent at least throughout said optical zone; a single closed chamber within said housing having a portion spanning the full extent of said optical zone and a portion outside of said optical zone; a plurality of immiscible liquids completely filling said chamber, at least two of said liquids being transparent, said transparent liquids having different refractive indices and forming between themselves an interface that is disposed substantially perpendicular to the optical axis of said system at all times, said contained liquids having preselected densities so that tilt of the system relative to the earth results in interdisplacement of said contained liquids within said chamber and a change in the contour of said interface in said optical zone so as to produce a change in the refractive power of said system over a continuous range, the sole impetus for said interdisplacement being gravitational force.

2. A lens system incorporated into a pair of spectacles for correction of impaired accommodation comprising a lens, a frame enclosing said lens at its periphery, an earpiece contiguous with said frame, a single complex closed chamber having a portion in said lens defining an optical zone and a portion in said earpiece, interconnecting means between said lens portion and said earpiece portion, and three immiscible liquids completely filling said chamber, two of said immiscible liquids being transparent, said transparent liquids having the same density but different refractive indices and polar properties and forming between themselves an interface that is disposed substantially perpendicular to the optical axis of said system at all times, the third of said immiscible liquids being confined to said earpiece, said immiscible liquids having preselected densities so that tilt of the system relative to the earth results in interdisplacement of said contained liquids within said chamber and a change in the contour of said interface in said optical zone so as to produce a change in the refractive power of said system over a continuous range, the sole impetus for said interdisplacement being gravitational force.

3. A spectacle lens system as defined in claim 2 in which the portion of said chamber in said earpiece takes the form of a curved cylinder having its concave aspect disposed substantially upward so that the portion of said cylinder nearest the earth changes continuously as said spectacles are tilted through a generally useful range.

4. A spectacle lens system as defined in claim 3 in which said curved cylinder has a uniform radius of curvature.

5. A spectacle lens system as defined in claim 3 in which said third immiscible liquid forms a single unbroken column within said curved cylinder, said column being freely movable within said cylinder and occupying a fixed volume greater than one-half the volume of said cylinder so that a central sector of said cylinder is always occupied by said column, and further including means for confining said third immiscible liquid within said cylinder.

6. A spectacle lens system as defined in claim 5 in which said third immiscible liquid is mercury.

7. A spectacle lens system as defined in claim 5 in which the portion of said chamber in said lens has front and back surfaces that are spherical in contour, said surfaces defining the extent of said optical zone and intersecting at their margins a surface having the shape of a narrow circular band, said band being incomplete where the optical zone portion of said chamber is continuous with the remainder of said chamber.

8. A spectacle lens system as defined in claim 7 in which said front surface is concave posteriorly and said back surface is convex posteriorly, both surfaces having the same radius of curvature.

9. A spectacle lens system as defined in claim 7 in which said interconnecting means comprise two discreet channels confined to said earpiece and said frame and connecting respective ends of said curved cylinder to said optical zone portion of said chamber, one of said channels opening in close proximity to said front surface, the other opening in close proximity to said back surface.

10. A spectacle lens system as defined in claim 9 in which said front surface and the forward half of said circular band have a strong surface attraction for one of said transparent liquids, and said back surface and the rear half of said circular band have a strong surface attraction for the other of said transparent liquids, said liquids, therefore, covering their respective surfaces in said optical zone, said interface, therefore, being disposed substantially perpendicular to said optical axis.

11. A spectacle lens system as defined in claim 10 in which said connecting channels and the two halves of said curved cylinder exert similar surface attractions for said transparent liquids as the surfaces in said optical zone with which they are respectively associated.

12. A spectacle lens system as defined in claim 10 in which said transparent liquids are separated in said curved cylinder by said column of said third immiscible liquid so that a change in orientation of said spectacles within a generally useful range results in displacement of one of said transparent liquids from said cylinder into said optical zone and displacement of the other of said transparent liquids from said optical zone into said cylinder, said displacement resulting in a change in the relative amounts of said transparent liquids occupying said optical zone and manifesting as a change in the contour of said interface.

13. A spectacle lens system as defined in claim 3 in which said curved cylinder has a non-uniform radius of curvature.

14. A spectacle lens system as defined in claim 7 in which said front surface is concave posteriorly and said back surface is convex posteriorly, said back surface having a radius of curvature greater than that of said front surface.

15. A spectacle lens system as defined in claim 7 in which said front surface is concave posteriorly and said back surface is planar.

16. A spectacle lens system as defined in claim 7 in which said front surface is concave posteriorly and said back surface is concave posteriorly, said back surface having a radius of curvature greater than that of said front surface.

17. A spectacle lens system as defined in claim 12 in which the length, diameter and disposition of said curved cylinder and the length of said column of said third immiscible liquid are adapted so as to produce a stable zone of tilt over which no change in refractive power occurs, said zone comprising the initial phase of tilt from the position of horizontal gaze.

18. A spectacle lens system as defined in claim 12 in which an obstructing or compressing means is incorporated into said system for the purpose of electively locking said immiscible liquids into a particular relationship with said chamber and with each other, thereby making each refractive power within the continuous spectrum available for vision in all spectacle orientations.

19. A spectacle lens system as defined in claim 12 in which the volume of transparent liquid in said curved cylinder is sufficient to produce a change in refractive power equal to three diopters when fully displaced.

20. A spectacle lens system as defined in claim 12 in which said front surface and forward half of said circular band are composed of glass treated with dimethyldichlorosilane, said back surface and rear half of said circular band are composed of glass, first transparent liquid being cyclotetra (methylphenyl) siloxane, there being an attraction between said first liquid and said front surface and forward half of said circular band, second transparent liquid being a 16.27% NaCl aqueous solution by weight, there being an attraction between said second liquid and said back surface and rear half of said circular band.

21. A bifocal contact lens for correction of impaired accommodation comprising a transparent housing; a single closed chamber having a central circular portion defining the optical zone, a peripheral annular portion, and interconnecting means between said circular and annular portions; two immiscible transparent liquids having different densities and different refractive indices, said liquids being disposed such that a portion of said optical zone surrounding the optical axis of said contact lens is occupied by one of said liquids with said optical axis positioned horizontally and by the other of said liquids when said lens has been tilted a certain minimum angle from horizontal.

22. A contact lens as defined in claim 21 in which the portion of said chamber in said optical zone has front and back spherical surfaces that define a positive liquid lens.

23. A contact lens as defined in claim 21 in which the denser of said liquids has the higher refractive index.

24. A contact lens as defined in claim 21 in which said optical zone covers at least the entire pupillary area.

25. A contact lens as defined in claim 21 in which said interconnecting means comprise at least three radially-disposed connecting channels distributed evenly around said optical zone.

26. A contact lens as defined in claim 21 in which the width of said annular portion is such that an interface between said liquids intersects the inner margins of said annular portion at substantially the same points with said lens tilted downwardly said minimum angle as it does with said optical axis positioned horizontally.

27. A contact lens as defined in claim 21 in which the depth of said chamber is augmented peripherally, the degree of augmentation and the width of the peripheral band of augmentation being such that an interface between said liquids intersects the inner margins of said band at substantially the same points with said lens tilted downwardly said minimum angle as it does with said optical axis positioned horizontally.

28. A contact lens as defined in claim 21 in which said chamber extends over the sclera.

29. A multifocal contact lens for correction of impaired accommodation comprising a transparent housing, a single closed chamber having a central circular portion defining the optical zone and a peripheral annular portion, at least three evenly-spaced radially-disposed channels connecting said optical zone portion and said annular portion, and two immiscible transparent liquids completely filling said chamber, said liquids having different refractive indices and very slightly different densities, said optical zone portion of said chamber having front and back surfaces that are spherical in contour, both surfaces being concave posteriorly and said front surface having a radius of curvature smaller than that of said back surface, there being a strong surface attraction between the denser of said liquids and both said front surface and the front surface of each of said connecting channels, there being a strong surface attraction between the less dense of said liquids and both said back surface and the back surface of each of said connecting channels, there being no significant surface attraction between either of said liquids and the remaining chamber surfaces, said liquids, therefore, covering their respective surfaces in said optical zone and forming between themselves an interface having a part in said optical zone portion of said chamber that is disposed substantially perpendicular to the optical axis of the contact lens at all times, and a part in the remainder of said chamber defining a horizontal plane.

30. A contact lens as defined in claim 29 in which said chamber conforms generally to the contour of a contact lens, said chamber, therefore, having a certain anteroposterior span responsible for displacement from said optical zone portion of said chamber of one of said liquids by the other with a change in orientation of said lens within a generally useful range, said displacement resulting in a change in the relative amounts of said liquids in the two portions of said chamber, and manifesting as a relocation of said horizontal part of said interface and a change in the contour of said part of said interface inside said optical zone.

31. A contact lens as defined in claim 30 in which the width of said annular portion is such that said horizontal part of said interface intersects the inner margins of said annular portion at substantially the same points with said lens tilted downwardly as it does with said optical axis positioned horizontally.

32. A contact lens as defined in claim 31 in which the depth of said chamber is augmented over said annular portion.

33. A contact lens as defined in claim 31 in which said chamber extends over the sclera.

* * * * *